A. J. MANNY.
Horse Hay-Rake.
No. 205,884.      Patented July 9, 1878.
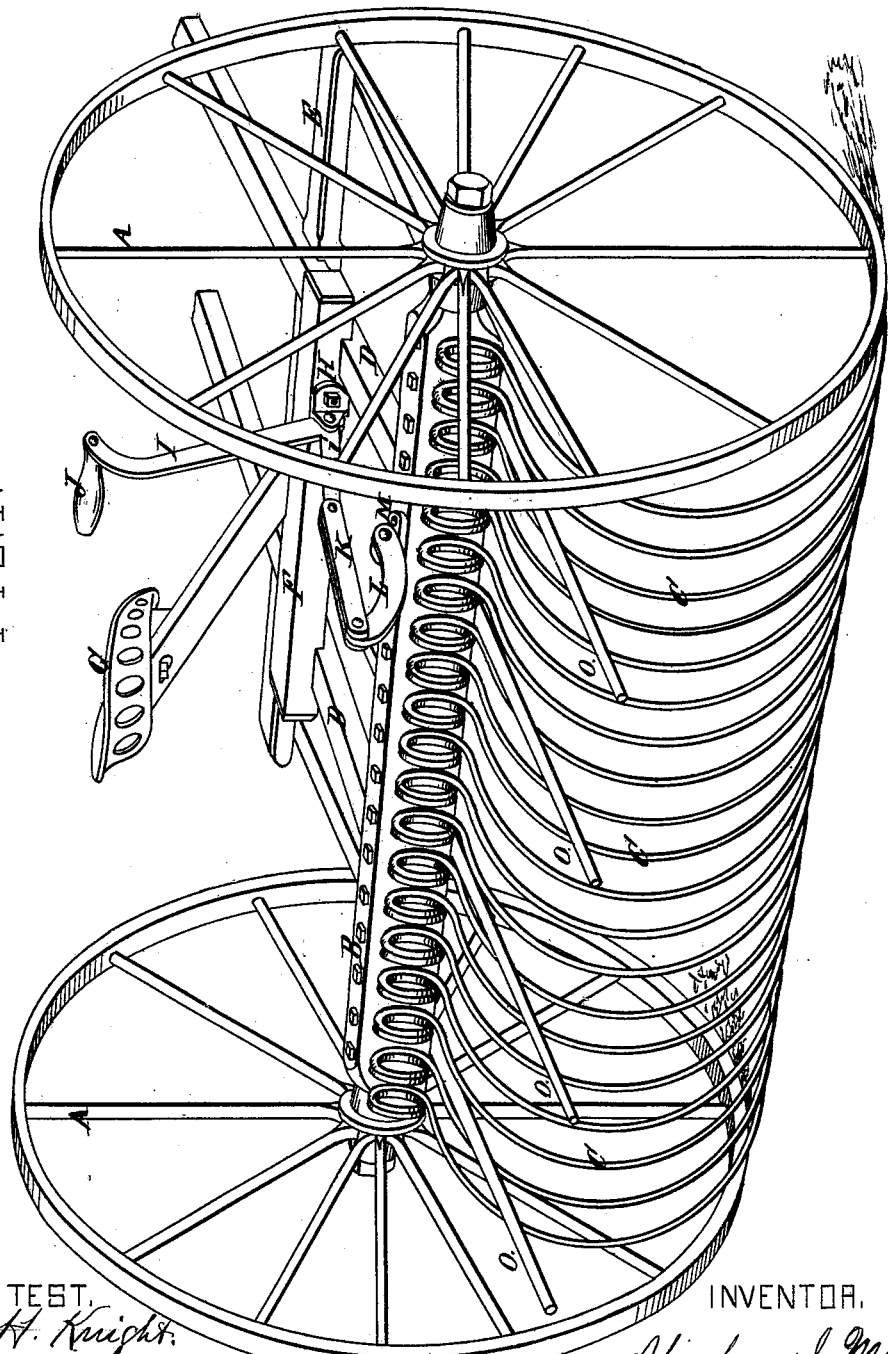

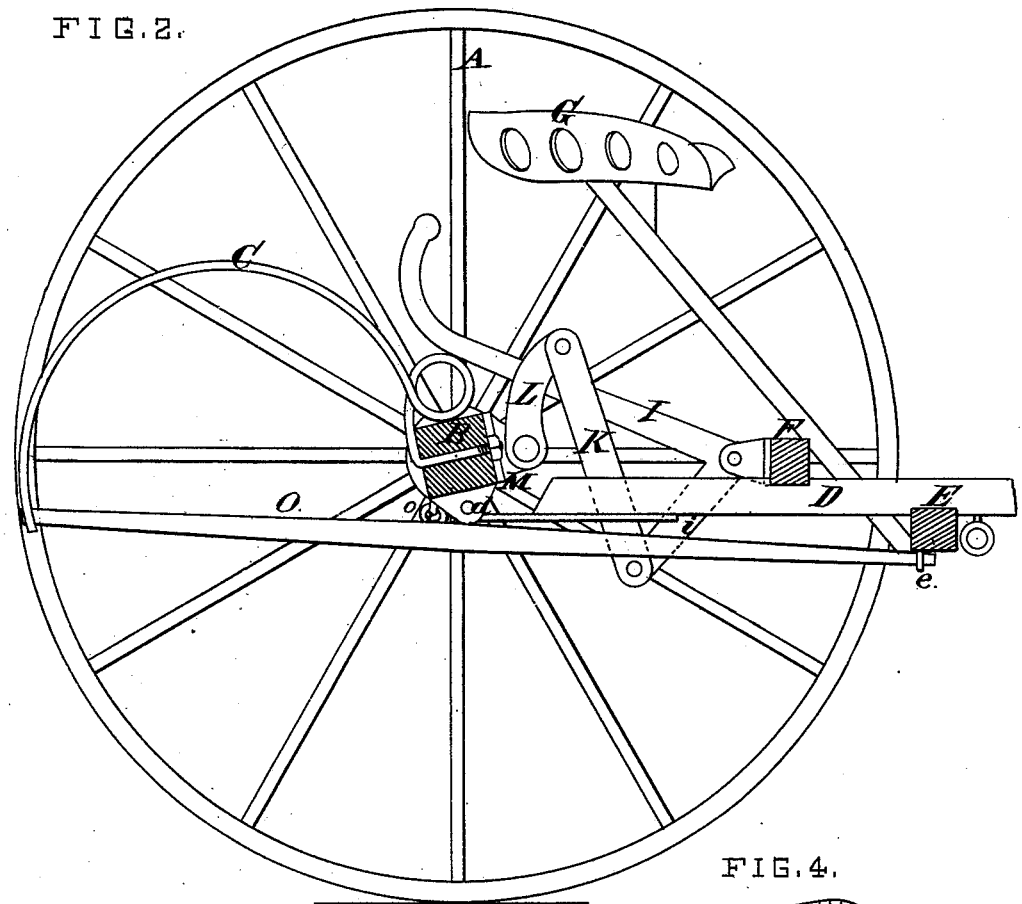

UNITED STATES PATENT OFFICE.

ABRAHAM J. MANNY, OF ST. LOUIS, MISSOURI.

IMPROVEMENT IN HORSE HAY-RAKES.

Specification forming part of Letters Patent No. 205,884, dated July 9, 1878; application filed March 7, 1878.

*To all whom it may concern:*

Be it known that I, ABRAHAM J. MANNY, of the city of St. Louis and State of Missouri, have invented a certain new and useful Improvement in Sulky Horse-Rakes, of which the following is a full, clear, and exact description, reference being had to the accompanying drawings, forming part of this specification.

My improvement relates to that class of rakes in which the teeth are raised or tilted to free them from their load, and in which the teeth are adjustable to different heights from the surface to be raked, as may be required by the inequalities of the ground or the condition of the hay, straw, or other substance upon the same.

The first part of my improvement relates to the cleaners, which prevent the load from following the teeth as they are raised, and thus causing its perfect discharge.

These cleaner-rods near their center are pivoted to the rake head or axle at its front lower corner, so that little vertical motion is given them by the tilting or rolling of the rake head or axle.

My improvement also relates to the gooseneck or arm by which the rake-head is tilted to discharge the load, and by which the adjustment of the teeth to different heights from the surface to be raked is made.

Attached to the top of the rake-head is a bracket, having an upwardly-projecting flange standing transversely to the rake-head, and having a slot curved concentrically with the axis upon which the rake-head turns. On one side the flange has a corrugated surface, the ribs and grooves extending radially to the axis of the rake-head. One end of the arm has ribs and grooves matching those upon the side of the flange, and is secured to the bracket by a screw-bolt passing through it and through the curved slot of the flange, and which, being tightened, holds them rigidly together.

The object of this construction is to adjust the outer end of the arm so that the point where it connects with the lever or tilting device shall remain at an equal distance from the axis upon which the rake-head revolves, and their relation to each other in height or distance of the points of connection with the lever and the fulcrum-point of the lever never be varied.

In the drawings, Figure 1 is a perspective view of the rake in raking position. Fig. 2 is a longitudinal section, showing the rake in discharging position. Fig. 3 is a detail section, showing in side view the position of the tilting lever and connection when in position shown in Fig. 1, and illustrating by dotted lines the adjustment of the rake-head in setting the points of the teeth at a higher elevation, showing that said adjustment of the head does not change the position of the dumping-lever or connecting-rod or goose-neck arm, owing to the slot in the goose-neck bracket being concentric with the axis of the rake-head, and the ribs of the bracket and goose-neck arm being radial to the axis, as hereinafter set forth. Fig. 4 is an enlarged side view of the bracket of the goose-neck. Fig. 5 is a top view of same, showing part of the arm.

A A are the ground-wheels. B is the rake-head. C are the teeth, attached to the head in the usual manner. D D are the shafts or thills, hinged at $d$ to the fore side of the rake head or axle. E and F are cross-bars connecting the thills, and serving also for the attachment of the seat G. H is the bracket attached to the rear side of the bar F, forming the fulcrum attachment of the bell-crank head-lever I. J is the handle of said lever.

The shorter arm $i$ of the lever is connected by rods K to the goose-neck arm L, which is rigidly but adjustably connected to the rake-head, so that the rake-head may be turned backward or forward on its axis by the movement of the lever I.

The pressure upon the points of the teeth in collecting the load tends to tilt them backward; but this is prevented by the connecting-point $k$ of the lever and rod K rising above a straight line drawn from the point at which the lever I is pivoted to the bracket H and the point at which the rods K are connected to the goose-neck arm L, and forming a lock-joint when the rake is in raking position, as shown in Figs. 1 and 3.

The goose-neck arm L is connected to the rake-head in the following manner: M is the bracket bolted to the top of the rake-head, and having a flange provided with a slot, $m$, curved so as to be concentric with the axis of the rake-head B, and the arm L is connected to the bracket by a screw-bolt, N, passing through one end of the arm and through the slot $m$. The side of the bracket has a corrugated face, $m'$, the ribs and grooves of which extend radially from the axis of the rake-head. The part of the arm L in contact with the face $m'$ has corrugations $l$ matching with those of the bracket, so that when the nut is screwed up on the bolt the ribs and grooves prevent the arm from turning on the bolt, and the arm is held rigidly to the bracket.

The movements of the hand-lever I are uniform backward and forward; and in order to adjust the rake-head to the proper relative position with the lever it is necessary that the connection between them should have capacity for adjustment. The slot $m$ furnishes such means, and the corrugations of the bracket and arm with the bolt N enable the arm to be held rigidly to the bracket and to its adjustment in the slot. The form and position of the slot $m$ (concentric with the axis of the rake-head) insures that that end of the arm L shall always be the same distance from the axis however it may be adjusted in the slot, and the direction of the ribs and grooves $m$ and $l$ (radial to the axis) insures that the outer end of the arm L shall always (whatever the adjustment of the arm in the bracket) be an equal distance from the axis. For instance, supposing the bracket M were being set forward on the arm L (to throw the points of the rake-teeth backward) and the slot $m$ were straight, it would increase the distance of the bolt N from the axis; but with the movement in a concentric slot the bolt retains an equal distance, and it will be seen as the bolt is moved backward in the slot the direction of the ribs and grooves $m'$ and $l$ oblige the outer end of the arm to descend, so as to keep it an equal distance from the axis. Thus it will be seen that it is impossible for any one to make a wrong adjustment of the arm upon the bracket, because the ribs and grooves $l$ and $m'$ will not match together in a wrong position.

The clearers or gleaners O, which prevent the load from being drawn up with the teeth, consist of rods, which extend beneath the head and are pivoted thereto by a hinge-joint, $o$, at the lower front corner of the rake-head. The front ends of the clearer-rods are connected to the bar E by a slip-joint, said ends passing loosely through staples $e$. The connection is such that the position of the rods is very slightly changed in the rolling of the axle.

I claim as my invention—

1. The combination of bracket provided with curved slot $m$ and corrugated face $m'$, and arm L, provided with corrugated face $l$ and connecting-bolt N, for the purpose set forth.

2. The combination of rake-head B, bracket M, with slot $m$, concentric with the axis of rotation of the rake-head, and corrugated surface $m'$, whose ribs extend radially to the axis of rotation of the rake-head, and the arm L, with corrugations matching those $m'$, for the purpose set forth.

3. The clearing-bars O, having sliding connection to the cross-bar E, and pivoted to the lower part of the rake-head, to avoid the depression of the rear ends of the bars O when the rake is in the discharging position, substantially as set forth.

ABRAHAM J. MANNY.

In presence of—
SAML. KNIGHT,
GEO. H. KNIGHT.